Nov. 22, 1960 F. H. SCHLECHT Re. 24,897
SAFETY SHOE WITH INSTEP GUARD
Original Filed April 6, 1959
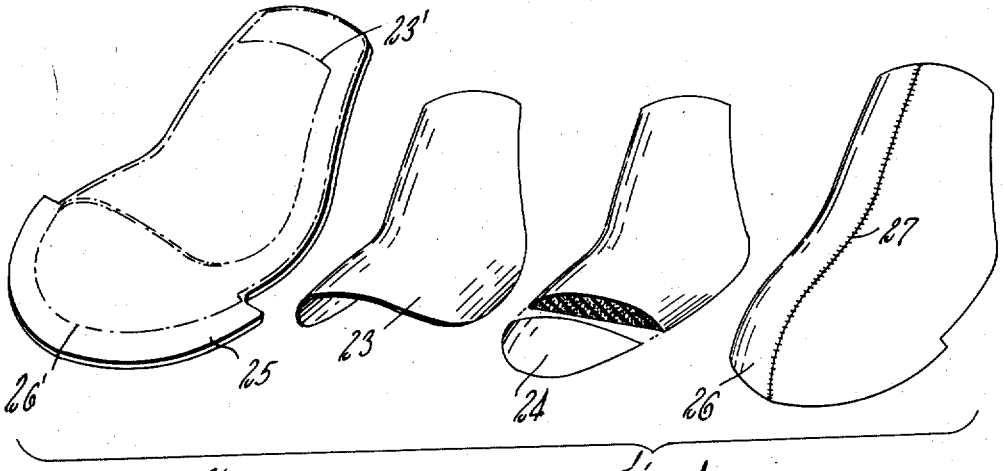
Fig. 4.
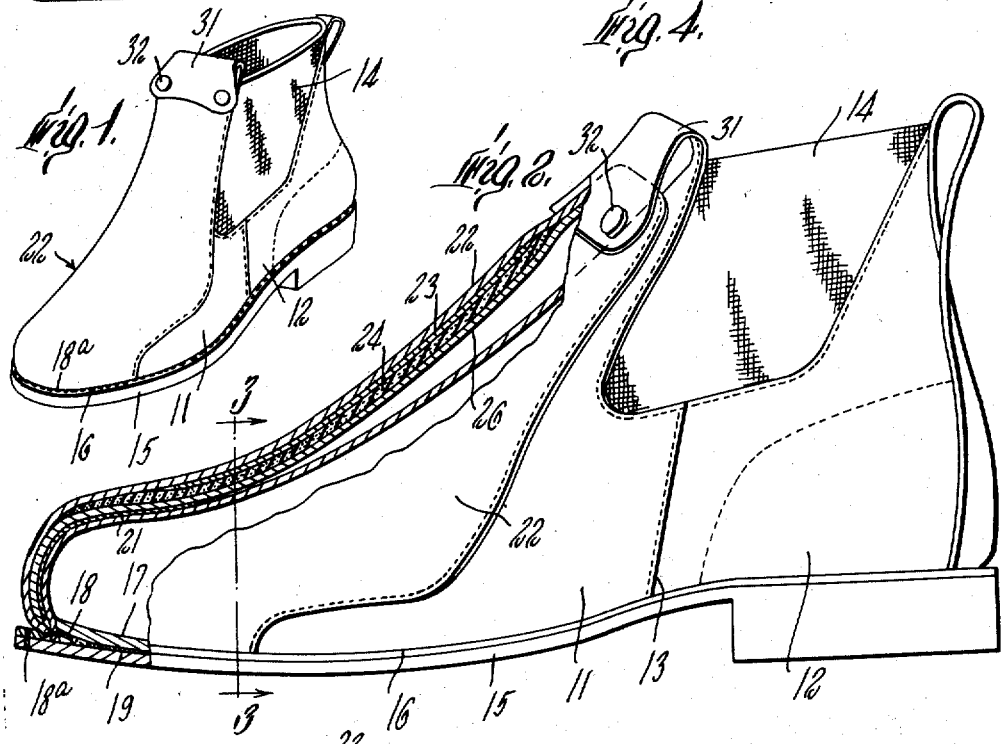
Fig. 1.
Fig. 2.
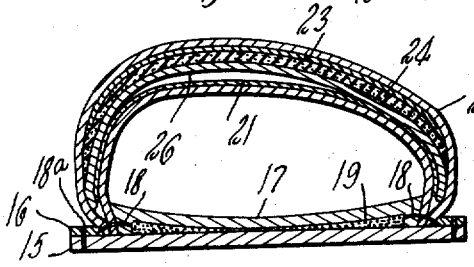
Fig. 3.
Inventor
Frederick H. Schlecht
By Robert S. Toperzer Atty.

United States Patent Office

Re. 24,897
Reissued Nov. 22, 1960

24,897

SAFETY SHOE WITH INSTEP GUARD

Frederick H. Schlecht, Worcester, Mass., assignor to H. H. Brown Shoe Company, Inc., Worcester, Mass., a corporation of Massachusetts Original No. 2,915,837, dated Dec. 8, 1959, Ser. No. 804,438, Apr. 6, 1959. Application for reissue Apr. 15, 1960, Ser. No. 22,655

4 Claims. (Cl. 36—72)

Matter enclosed in heavy brackets [ ] appears in the original patent but forms no part of this reissue specification; matter printed in italics indicates the additions made by reissue.

The present invention relates to footwear and in particular it is concerned with safety shoes of the type having a guard for the instep of the wearer.

As is well known to those skilled in the art, safety shoes or boots are characterized generally by the provision of a metal cap in the toe to protect the wearer from an accidental blow. Although shoes of this kind have contributed greatly to the reduction of industrial injuries especially from falling objects, it is apparent that not always does the blow fall in the area of the toes alone. For this reason it has been proposed to provide safety shoes with a guard of some sort which will protect the instep of the wearer as well as the toes. Heretofore the problem has been, however, to make the guard stiff enough so as to be effective and yet not interfere with the normal action of the foot in walking. To my knowledge, safety shoes with instep guards have met with very little, if any, success simply because no way was found to construct and mount the guard on the shoe in a manner to afford a reasonable degree of comfort.

The present invention has as its object the provision of a safety shoe that not only offers protection to both the toes and the instep, but also that can be worn comfortably.

Another object of the invention is to provide for a shoe of the above-mentioned character, an instep guard that is permanently attached for convenience and yet can be readily manipulated in such a way as to permit the wearer to insert and remove his foot without difficulty.

A still further object of the invention is to provide a reasonably attractive shoe of this kind so as to encourage its use especially in connection with industrial safety programs.

The novel features of the invention together with further objects and advantages will become apparent from the following detailed description and the drawing to which it refers.

In the drawing:

Fig. 1 is a perspective view of a safety shoe according to the present invention;

Fig. 2 is a view in elevation of the shoe according to the present invention with certain parts broken away to show its construction more clearly;

Fig. 3 is a sectional view taken on line 3—3 of Fig. 2, and

Fig. 4 is an exploded view showing the parts of the instep guard for the shoe according to the present invention.

With reference now to the drawing, it will be observed that, in part, conventional work shoe construction is used. Thus the numeral 11 designates the vamp, and the numeral 12 designates the quarter which are sewn together by the seam 13. In addition to the vamp and quarter, the shoe upper includes gores 14 of elastic fabric. For this reason the forward edge of the quarter and the rearward edge of the vamp do not meet along their entire length but rather are connected by the gore 14 as shown.

The outsole 15 of the shoe is joined to the upper by means of a welt 16 as is the insole 17. The numerals 18 and 18a designate the welt stitching, and numeral 19 designates the filler layer used between the outsole and insole, as shown in Figs. 2 and 3. Also in Figs. 2 and 3 is seen the cap 21 for the protection of the toes of the wearer, which is usually made of metal and which conforms to and overlies the toe portion of the upper. In accordance with the invention, overlying the toe cap and the instep portion of the upper I provide an instep guard designated generally by the numeral 22. The instep guard serves also to hold the toe cap in place in a manner that will best be understood by reference to the exploded view of Fig. 4. There it is seen that the instep guard includes a core 23 shaped to conform generally to the instep and comprised of relatively rigid material. A preferred material for the core 23 is aluminum although certain plastic materials have been found suitable also. One is a copolymer of polystyrene, butadiene rubber and acrylonitrile, which has high impact strength. Beneath the core is a layer of cushioning material 24 such as sponge rubber or other suitable expanded cellular material, the core 23 and layer 24 being held between inner and outer parts 25 and 26, of a cover of leather. The two superposed parts of the cover are sewn together, the outer part 25 overlying the core 23, and the inner part 26 underlying the layer of cushioning material. The seam between the inner and outer cover parts follows the edge of the inner cover, and in addition there is a seam 27 that runs down the middle of the inner cover. This is because the inner cover is preferably formed with two adjacent halves and the seam 27 simply represents the stitching which holds them together. In this way, the inner cover can be made to conform more faithfully to the contour of the core and the instep.

The relative positions of the assembled parts, for the sake of clarity, are outlined in dash-dot lines in the left hand view of Fig. 4. The edge of the inner cover which is sewn to the outer cover has been represented by the dot-dash line 26', and the edge of the core by the dot-dash line 23'. Thus it is seen that the forward end of the inner cover extends some distance beyond the core, and the outer cover extends some distance beyond the inner cover. By means of this extended portion of the outer cover, the instep guard is permanently joined to the sole together with the upper. This is best shown in Figs. 2 and 3, where it will be observed that the forward edge of the outer cover coincides generally with that of the upper so that the welt stitching 18 simply passes through both to attach them to the rib of the insole 17.

At the rearward (upper) end of the instep guard, the edges of the inner and outer covers coincide although the core and underlying cushion terminate short thereof. In this way a relatively flexible region is provided at this end of the guard for detachable fastening to the instep portion of the upper. For the latter purpose, there is sewn to the rear upper edge of the vamp, in the region between the gores, a flap 31 of leather which is adapted to extend forward and down over the upper edge of the instep guard. On the flap are two spaced snap fasteners 32 which cooperate with snaps provided on the guard. These may be entirely conventional, in which case they are joined to the flap and to the guard as by rivets.

In use, the snaps are undone to permit the wearer to insert his foot into the shoe, which he can do without any difficulty by virtue of the expansible nature of the gores. The snaps are then fastened to limit the extent to which the instep guard can move so that there will be no tendency for the guard to flop around and to become caught on projecting objects. Also dirt is kept from falling down in between the vamp and guard. In the case of an accidental blow, the hard core functions as a load-distributing member not only to prevent concentration of the blow at one point, but also to transmit a substantial part of the force to the metal cap upon which the guard rests. Since the cap is adapted to come down against the sole and not the toes, it follows that the force of the blow on the guard that is transmitted to the cap will, in turn, by-pass the toes and be retransmitted to the sole where it will be ineffective to produce injury.

According to my invention, therefore, I am able to provide an instep guard which affords optimum protection and yet by virtue of its construction and mode of mounting does not interfere at all with the action of the foot. Another feature of the novel shoe is that it may be put on or taken off with ease in spite of the fact that the instep guard covers the entire instep portion of the upper and is lasted under the toe and part of the sides as an integral part of the shoe.

It should be understood, however, that the front end of the instep guard has sufficient flexibility so that once the rearward end has been detached from the upper it can be pulled away from the vamp a distance amounting to at least several inches. Hence it is within the contemplation of the invention that an upper embodying a tie construction can be utilized instead of gores, if desired. For that matter, the invention is by no means limited to snap fastening of the guard, for, as is apparent, any suitable mode of detachable or separable connection will serve equally well from a purely functional standpoint, the snap fasteners being preferred because of the ease with which they can be manipulated.

Other modifications of this nature, nevertheless, within the spirit and scope of the invention, will no doubt occur to those skilled in the art, such as by way of further example oxford type or full length boots instead of ankle length boots or shoes. Therefore, the invention should not be deemed to be limited to the details of what has been described but rather it should be deemed to be limited only to the combination as claimed.

What is claimed is:

1. A safety shoe comprising an upper, said upper including a portion adapted to cover the instep of the wearer, a reinforced toe portion and a gore portion to make said upper expansible and thereby facilitate entry and removal of the foot of the wearer, a sole, an instep guard overlying the instep and toe portions of said upper, said instep guard being formed with a relatively rigid core member having its forward end bearing on said toe portion, a layer of cushioning material disposed beneath said core member, an outer cover over said core member, and an inner cover underlying said cushioning material and being joined by its marginal edges to said outer cover, said inner and outer covers extending rearwardly beyond said core member and said outer cover extending forwardly beyond said inner cover, a welt to permanently join the forward end of said outer cover and said upper to said sole, and means to detachably fasten the rearward end of said outer cover to said upper.

2. A safety shoe comprising an upper, said upper including a portion adapted to cover the instep of the wearer, a reinforced toe portion, and means to make said upper expansible and thereby facilitate entry and removal of the foot of the wearer, a sole, an instep guard overlying the instep and toe portions of said upper, said instep guard being formed with a relatively rigid core member having its forward end bearing on said toe portion, a layer of cushioning material disposed beneath said core member, an outer cover over said core member and an inner cover underlying said cushioning material and being joined to said outer cover, said covers extending rearwardly beyond said core member and one of said covers extending forwardly beyond the other, the forward end of said one of the covers being permanently joined to said upper and to said sole, and means to detachably fasten the rearward end of said one of the covers to said upper.

*3. A safety shoe comprising an upper, a sole, an instep guard including an inner cover, an outer cover, a relatively rigid core secured therebetween for overlying and protecting the instep, and means for flexibly detachably securing the rear portion of said instep guard to said upper, said instep guard being flexibly anchored with respect to said sole forward of said means to permit movement of said rear portion relative to said upper, whereby said rear portion is sufficiently movable relative to said upper to permit walking ease even when secured by said detachably securing means.*

*4. The safety shoe of claim 3 in which said instep guard is anchored to said sole with such flexibility that said rear portion is movable away from said upper a distance amounting to at least several inches when not secured by said flexibly detachably securing means.*

References Cited in the file of this patent or the original patent.

UNITED STATES PATENTS

| | | |
|---|---|---|
| 1,110,624 | Guiffre | Sept. 15, 1914 |
| 2,615,261 | Grotto | Oct. 28, 1952 |
| 2,712,185 | Corrigan | July 5, 1955 |
| 2,829,449 | Edwards et al. | Apr. 8, 1958 |
| 2,842,872 | Shultz | July 15, 1958 |